United States Patent [19]
Beck et al.

[11] Patent Number: 5,842,649
[45] Date of Patent: Dec. 1, 1998

[54] PRECISION PLACEMENT SPREADER

[75] Inventors: Glenn M. Beck, Loves Park; Edwin A. Friedl, Charleston, both of Ill.

[73] Assignee: The Louis Berkman Company, Steubenville, Ohio

[21] Appl. No.: 883,580

[22] Filed: Jun. 26, 1997

[51] Int. Cl.$^6$ .................................................. A01C 19/00
[52] U.S. Cl. ......................... 239/677; 239/679; 239/688; 239/689
[58] Field of Search ...................................... 239/674, 676, 239/679, 677–684, 685, 688–689, 663, 155

[56] References Cited

U.S. PATENT DOCUMENTS

| | | |
|---|---|---|
| 842,238 | 1/1907 | Park . |
| 1,746,410 | 2/1930 | Tolman, Jr. . |
| 3,097,711 | 7/1963 | Clark . |
| 3,113,784 | 12/1963 | Swenson . |
| 3,329,322 | 7/1967 | Herd ..................................... 239/687 X |
| 3,332,691 | 7/1967 | Swenson . |
| 3,776,431 | 12/1973 | Riley ..................................... 239/677 X |
| 4,167,248 | 9/1979 | Akazawa ............................. 239/688 X |
| 4,212,428 | 7/1980 | Walker ..................................... 239/677 |
| 4,266,731 | 5/1981 | Musso, Jr. . |
| 4,283,014 | 8/1981 | Devorak ..................................... 239/677 |
| 4,367,848 | 1/1983 | Ehmke et al. ....................... 239/676 X |
| 5,186,396 | 2/1993 | Wise et al. ........................... 239/677 X |

FOREIGN PATENT DOCUMENTS

| | | | |
|---|---|---|---|
| 344563 | 11/1921 | Germany . | |
| 297920 | 11/1965 | Netherlands ............................. 239/688 |
| 169976 | 1/1960 | Sweden .................................. 239/688 |
| 1184453 | 4/1983 | U.S.S.R. . | |

*Primary Examiner*—Kevin Weldon
*Attorney, Agent, or Firm*—Vickers, Daniels & Young

[57] ABSTRACT

A truck having a conveyor arrangement and a material spreader and a control mechanism to regulate the speed said conveyor arrangement conveys materials and to regulate the velocity the materials are ejected from said material spreader. The material spreader includes a material guider to guide the trajectory of substantially all of the materials in a direction substantially opposite the direction of forward movement of the truck. The control mechanism also includes a velocity sensor adapted to detect the velocity of the truck and to send a signal indicative of the truck velocity to a velocity controller. The velocity controller sends a signal to the conveyor arrangement and the material spreader which is dependent on the truck velocity to control the conveyor arrangement and the velocity of the materials ejected from the material spreader to obtain a material velocity relative to the ground surface of substantially zero when the truck is moving.

51 Claims, 8 Drawing Sheets

PRECISION PLACEMENT SPREADER

The present invention relates to the art of trucks having an apparatus for spreading materials and, more particularly, to an improved truck having an integrated spreader system which allows for improved control of dispensing the contents of a dump truck and for spreading a controlled amount of materials in a substantially narrow strip.

INCORPORATION BY REFERENCE

U.S. Pat. No. 3,332,691 illustrates a spreader apparatus for spreading materials and is incorporated herein by reference. U.S. Pat. No. 3,113,784 illustrates hydraulic control circuits for a conveyor and a spreader and is incorporated herein by reference.

BACKGROUND OF THE INVENTION

Trucks, such as dump trucks, have commonly been used to convey materials such as salt, cinders, chemicals and/or sand for the purposes of spreading these materials onto road surfaces to improve the traction of the road surface during hazardous conditions. The materials in the truck are commonly dispensed by tilting the dump body of the truck thereby releasing the goods from the dump body and/or conveying the materials within the dump body out through an opening in the rear of the dump body. The materials which are conveyed out through the rear of the dump body can be spread by use of a spinner which creates a wide spray pattern behind the rear of the truck as the truck moves in the forward direction. Such a spinner design is known as a broadcast spinner design and is illustrated in U.S. Pat. Nos. 4,266,731, 3,332,691; and, 3,113,784.

In some applications, it is sometimes desirable to be able to spread the particulate material in a relatively narrow strip in the road. In such circumstances, a broadcast spinner design cannot perform such a function since the spinner sprays the material over a wide area on the ground surface. In order to prevent the broadcast spraying of the particulate material, a material guide must be positioned closely adjacent to the rotating spinner so as to narrow the spread of particulate materials being deposited onto the ground surface. One such material guide is disclosed in U.S. Pat. No. 3,332,691.

The '691 patent discloses a material guide attachment attached and positioned on the side of the spinner. The attachment is adapted to receive materials which are projected toward the side of the truck and to guide the projectory of such materials 90° so that such materials are deposited rearwardly of the direction traveled by the vehicle. The '691 patent also discloses that the material guide attachment is designed to deposit the particulate material at a rearward velocity which is substantially equal to the forward velocity of the vehicle so that the velocity of the particulate material upon contacting the ground surface is substantially zero. The design disclosed in the '691 patent has been found to adequately deposit materials in a narrow strip as long as the truck maintains relatively slow velocity. However, it has been found when the velocity of the truck exceeds 25 mph, the material guide design is unable to maintain rearward velocities of the deposited particulate material to coincide with the forward velocity of the vehicle thus resulting in unwanted bouncing and scattering of the particulate material. This speed limitation is a result of the material guide attachment design. The spinner of the '691 patent propells the particulate material in a direction perpendicular to the forward movement of the truck. The material guide attachment includes a 90° shoulder adapted to redirect the propelled particulate material 90° so as to deposit the particulate material rearwardly of the forward moving truck. Due to the design of the 90° shoulder, the velocity at which the particulate material is directed toward the shoulder has to be minimized so as not to powderize the particulate material upon contact with the shoulder or to cause the particulate material bounce off from the shoulder. As a result, the velocity at which the particulate material could be propelled from the spinner was limited. Furthermore, the impact of the particulate material onto the shoulder of the material guide causes the particulate material to cake and to deposit on and around the shoulder. Such a caking problem is compounded in wet road conditions and/or when deicing fluid comes in contact with the material guide. Since the material guide is not shielded from the environment, caking and corrosion of the material guide can rapidly occur. The caking problem, especially at the shoulder of the material guide, adversely effects the velocity of the particulate material being redirected by the material guide, thus resulting in uneven reward velocities of the particulate material and unwanted scattering of particulate material on the road surface. Consequently, the material guide must be periodically cleaned in order to achieve zero velocity spreading at low forward truck velocities. The material guide of the '691 patent has the added disadvantage of not being able to prevent particulate material from being propelled over the top edge or under the bottom edge of the shoulder which results in the waste of particulate material off the side of the road. Such wasted particulate material was not only costly, but can be adverse to vegetation on the side of the road. In addition, the '691 patent does not disclose a spreader which can deposit the particulate material in a narrow strip irrespective of the velocity variations of the truck during operation.

As a result of the limitations in material particulate spreaders to deposit a particulate material in a substantially narrow strip along the road as the truck travels over a large range of speeds, there has been a demand for a material guide which can overcome such deficiencies. In addition, there is developed a demand for an integrated control system which both controls the rate materials are deposited to the spreader and the velocity to which the spreader ejects particulate materials to obtain the desired quantity of particulate material spread on the ground in a desired spread configuration.

SUMMARY OF THE INVENTION

The present invention relates to an improvement in trucks having an apparatus for spreading particulate material on a ground surface as the truck travels in a forward direction.

In accordance with a preferred embodiment of the present invention, there is provided a truck having a hopper for holding materials. The hopper includes an opening for materials to be dispensed from the hopper. The opening may include a feedgate to control the amount of materials exiting the opening. Preferably, the hopper includes two side walls which are angularly positioned with respect to the base so as to provide slope surfaces which slope downward to the base of the hopper. The opening in the hopper is preferably positioned at the rear wall of the hopper and closely adjacent to the base of the hopper. At the base of the hopper, there is incorporated a conveyor system which moves particulate material such as sand, salt, gravel, cinders, chemicals and the like in the hopper toward the opening in the hopper. Preferably, the conveyor system extends longitudinally from the forward end of the hopper to the rear end of the hopper and is evenly spaced between the two side walls of the hopper. The opening in the hopper is preferably in longitudinal alignment with the conveyor system. If the hopper includes a feedgate, the feedgate is preferably a vertically adjustable feedgate mounted closely adjacent to the opening or a feedgate which slidably moves up and down to control the size of the passageway through the opening in the hopper; however, a rotatable feedgate can also be used. A material spreader arrangement is positioned on the truck to receive particulate material exiting the opening of the hopper and to spread such particulate material onto the ground surface. The material spreader may be positioned directly below the hopper opening or positioned off to the side of the hopper opening. The material spreader position will depend on the particular spreading arrangement and spreading application for a particular spreader. The material spreader arrangement includes a material guide which, when engaged, guides the trajectory of substantially all the materials expelled from the material spreader arrangement in a direction substantially opposite of the forward direction of the truck and does not adversely affect the reward velocity of the particulate material. A control mechanism is included on the truck to regulate the speed of the conveyor system thereby controlling the amount of material being expelled through the opening in the hopper. The control mechanism is also preferably integrated with the material spreader arrangement to regulate the velocity of materials which are ejected from the material spreader arrangement. The control mechanism is designed to obtain a velocity reading of the truck and to use such information to control the conveyor system and/or material spreader arrangement so as to maintain a constant quantity of materials being deposited on a ground surface irrespective of the speed of the vehicle of the truck and/or to deposit the particulate material on a ground surface at a zero velocity relative to the ground surface.

In accordance with another aspect of the present invention, the conveyor system is mounted below the base plane of the hopper. Such positioning of the conveyor system facilitates in the conveyance of substantially all the particulate material in the hopper to the opening in the hopper. The conveyor system includes a material mover such as a continuous belt, a chain link, an auger or other designs which can effectively move particulate materials from one area in the hopper to the opening in the hopper. The conveyor system also includes a conveyor motor designed to drive the material mover and cause the particulate materials to be expelled through the opening in the hopper. The motor can be a hydraulic motor, an electric motor and/or a gas power motor. A gear box arrangement is preferably included to help drive the material mover.

In accordance with yet another aspect of the present invention, the material spreader arrangement includes a rotating member designed to propel particulate materials, which are received in the material spreader arrangement, out of the rear of the material spreader arrangement. Preferably, the rotating member is a spinner which rotates about an axis which axis is substantially perpendicular to the ground surface. However, a wide variety of rotating members having various axis of rotation may be used on the material spreader. The rotating member preferably includes at least one vane extending from the surface of the rotating member which is adapted to engage and throw material outwardly as the spinner rotates. If the rotating member is a spinner, preferably the spinner includes multiple upwardly extending vanes so as to efficiently propel a large volume of particulate material from the material spreader. The material spreader arrangement also includes a motor designed to rotate the rotating member. The motor may be a hydraulic motor, an electric motor and/or a gas power motor. A retainer wall is preferably included in the material spreader arrangement to retain substantially all the material on the rotating member until the material is propelled through the opening in the rear of the material spreader arrangement. If the rotating member is a spinner, the retaining wall preferably extends at least 180° about the spinner and is positioned such that the particulate materials are retained on the spinner and propelled by the vanes on the spinner for a sufficient time to be properly propelled from the spinner at a desired velocity. The height of the retaining wall is preferably a height greater than the height of the vanes on the spinner.

In accordance with another aspect of the present invention, the material spreader arrangement includes a material guider designed to direct particulate material expelled from the rotating member in a direction which is substantially opposite the direction of the forward movement of the truck. The material guider preferably extends rearwardly from the material spreader arrangement and includes a substantially planar wall which is positioned closely adjacent to the rotating member and is preferably attached to the retaining wall of the material spreader arrangement. The planar wall extends rearwardly from the rotating member in a plane substantially parallel to the longitudinal axis of the truck. The material guider also preferably includes an angular wall member which forms a varying width passageway closely adjacent to the rotating member. Preferably, the wide end of the passageway is positioned near the rotating member and the width of the passageway decreases as the distance from the rotating member increases. The narrowing of the passageway through the material guider preferably terminates into a constant width section of the material guider which width is substantially constant until the materials are completely expelled from the material guider. The varying width passageway is designed to collect materials expelled from the rotating member and to narrow the stream of materials so that the materials which eventually are expelled from the constant width passageway are deposited in a narrow strip on the ground surface. The design of the varying width passageway of the material guider is selected so as to not substantially reduce the velocity of the materials being expelled from the rotating member as the stream of particulate materials are narrowed into the constant width section of the material guider. As can be appreciated, the varying width passageway can be eliminated and a constant width passageway could be substituted therefore so as to form a constant width passageway from the rotating member to the particle expelling point. Other passageway designs can also be incorporated as long as the design does not substantially reduce the particle velocity of particles being propelled by the rotating member. The material guider also includes a top plate so as to prevent particulate material from escaping the material guider and randomly spreading onto the ground surface. The top plate also prevents rain or other liquids from entering the material guider passageway which could cause caking and/or corrosion in the passageway. The material guider may also include a base plate which at least partially retains the materials in the material guider as the materials pass through the material guider and to further seal the passageway from moisture which could result in caking and/or corrosion. The material guider arrangement also provides for self cleaning of the passageway. Any caking which begins in the passageway is immediately removed by the particulate material scraping off the caking as the particulate material moves rearwardly through the passageway. The material guide design also eliminates powderization problems at high particle velocities by not causing the particulate material to substantially alter its trajectory upon leaving the rotating member.

In accordance with still yet another aspect of the present invention, the material spreader arrangement includes a collection bin designed to collect particulate materials expelled from the rear of the hopper and through the rear opening and to direct such materials into a particular section of the material spreader arrangement so that the rotating member engages such materials and expels such materials from the material spreader arrangement. Preferably, the material bin includes a large top opening adapted to receive the particulate material which is being expelled through the opening in the hopper. This material bin also preferably includes a slope section which progressively narrows the passageway of the material bend so as to deposit the materials in a particular area in the material spreader arrangement. In an alternative design, the material bin may also include adjusting shoots which are designed to alter the location at which the materials are deposited in the material spreader arrangement. One type of adjusting shoot arrangement is disclosed in U.S. Pat. No. 3,332,691. The ability to control the position of the materials being deposited in the material spreader arrangement allows for the control of various types of spray patterns caused by the rotating member as the particulate material exits the material spreader arrangement.

In accordance with another aspect of the present invention, the control mechanism includes a velocity monitor to detect the speed of the truck. The velocity monitor may be connected to the speedometer of the truck, to one of the axles of the truck and/or may include a radar gun attached to the frame of the truck. The signal received from the velocity monitor is processed by the control mechanism and is used to send a control signal to the conveyor system and/or material spreader arrangement. Preferably, the control mechanism uses an arithmetic function and/or state tables to send a control signal to the conveyor system and/or material spreader arrangement as a function of the signal received from the velocity monitor. The arithmetic function and/or state tables are preferably stored in memory locations of a microprocessor. The microprocessor is preferably designed to rapidly calculate and/or select one or more values dependent on the velocity of the truck and to send such values to the conveyor system and/or material spreader arrangement. As can be appreciated, the control mechanism can be set so as to maintain a constant quantity of particulate materials deposited on a ground surface during the operation of the truck. During such operation, the control mechanism is activated for depositing a desired volume of particulate material on the ground surface. During the movement of the truck, the control mechanism monitors the speed of the truck and sends a signal to the conveyor system to increase or decrease the speed of the conveyor motor which causes a desired amount of particulate material to be expelled through the opening in the hopper. The control mechanism may also send a signal to the material spreader arrangement to regulate the speed of the rotating member so as to assure that the material spreader arrangement properly deposits the quantity of particulate material being fed to the material spreader to the ground surface. A sensor can be attached to the material mover and/or conveyor motor to monitor the speed of the material mover and to send a feedback signal to the control mechanism to further adjust the speed of the material mover. If a feedgate door is attached to the hopper opening, the control mechanism may be connected to the feedgate door to monitor and/or control the size of the hopper opening by controlling and/or monitoring the position of the feedgate door. If the feedgate door is controllably movable, the feedgate door is preferably connected to a motor and/or hydraulic system designed to move the feedgate door.

In accordance with another aspect of the present invention, the material spreader arrangement includes a mechanism for engaging and disengaging the material guider. In such an arrangement, the material guider or a portion thereof is mounted so that it can be raised or lowered into engagement with the particulate material being expelled from the rotating member. Preferably, the material guider is pivotally mounted to the rear portion of the material spreader arrangement. The movement of the material guider can be accomplished by a hydraulic lifter, motor or by some other mechanical means. If a hydraulic lifter is used, the control mechanism can be connected to the hydraulic system so that the engagement and disengagement of the material guider or a portion thereof can be controlled from a remote location.

In still another aspect of the present invention, the control mechanism controls the material spreader arrangement so as to deposit particulate material on a ground surface which is substantially zero with respect to the ground surface. In such an operation, the control mechanism is set to deposit materials at zero velocity. If the material guider is automatically engagable and disengagable, the control mechanism engages the material guide, otherwise the material guider is manually engaged. When the truck is moving, the control mechanism monitors the speed of the vehicle and sends a signal to the material spreader arrangement which is dependent on the speed of the truck. The signal may be the result of an arithmetic function and/or from state tables. The signal to the spreader arrangement controls the speed of the rotational member. The rotational speed of the rotating member is dependent on the speed of the truck so that the particulate material which is expelled from the material guider by the rotational member in a direction substantially opposite of the forward movement of the truck is traveling at a velocity which is substantially the same as the velocity of the truck. Such a particulate velocity results in a substantially zero velocity of the particulate material relative to the ground surface. When the truck changes velocity, the control mechanism sends a different signal to the spreader mechanism to adjust the rotational speed of the rotating member so that the velocity of the particulate material is adjusted to closely match the velocity of the truck. A sensor can be attached to the rotating member and/or rotating member motor to monitor the speed of the rotating member and to send a feedback signal to the control mechanism to further adjust the speed of the rotating member.

In still yet another aspect of the present invention, the control mechanism controls the material spreader arrangement so as to enable a constant quantity of particulate material to be deposited on the ground surface along a relatively narrow strip at a velocity which is substantially zero with respect to the ground surface. In such an operation, the control mechanism controls both the conveyor system and the material spreader arrangement. During operation, a desired amount of material to be deposited on the ground surface is imputed into the control system by the operator. When the truck is in movement, the control mechanism monitors the speed of the truck and sends a signal to the conveyor arrangement which is dependent on the quantity of material to be deposited on the ground and the speed of the truck. The signal may be the result of an arithmetic function and/or from state tables. The signal to the conveyor arrangement causes the speed of the material mover to be adjusted so that the desired amount of materials are expelled through the opening in the hopper. The speed of the material mover is dependent on the speed of the truck. The control mechanism also sends a signal to the material spreader arrangement to control the rotational speed of the rotating member. The rotational speed of the rotating member is dependent on the speed of the truck. The control signal causes the rotating member to rotate at a velocity to cause particulate material which is expelled from the material guider to have a velocity which is substantially the same as the forward velocity of the truck which translates into a relative zero velocity with respect to the ground surface. When the speed of the vehicle increases or decreases in speed, the control mechanism responds by altering the signal to the conveyor system and to the material spreader arrangement so as to adjust for the changes in speed of the truck. If the material guider is pivotally mounted to the material spreader and can be engaged and disengaged from a remote location, the control of the material guider is integrated into the control mechanism so that when an operator selects a narrow strip spread pattern, the control mechanism causes the material guider to be moved into engagement during such an operation. In a further modification of the control mechanism, control sensors may be included on the conveyor arrangement and/or material spreader so as to monitor the actual velocity of the material mover of the conveyor arrangement and/or the rotational speed of the rotating member and to send such information back to the control mechanism so the control mechanism can process such speeds and make any adjustments to such speeds as necessary.

The primary object of the present invention is to provide a truck which can dispense material in a controlled manner.

Another object of the present invention is to provide a truck which can dispense particulate material in a substantially narrow strip as the truck moves in a forward direction.

In accordance with still yet another object of the present invention is to provide a truck which can deposit a narrow strip of particulate material on a ground surface at a velocity which is substantially zero with respect to the ground surface.

In accordance with yet another object of the present invention is to provide a truck having a control mechanism designed to monitor the speed of the truck and to control the rate of dispensement of materials from the truck onto a ground surface which is dependent on the speed of the truck.

It is another object of the present invention to provide a material guider designed to control the velocity and trajectory of materials being expelled from a truck so as to deposit such materials in a narrow strip over a wide range of velocities of a truck.

It is still another object of the present invention to provide a material guider which can deposit materials in a narrow strip and in a guide spread area.

In accordance with yet another object of the present invention is to provide a truck incorporating a control mechanism using feedback control to monitor the dispensement of materials from the truck onto a ground surface.

These and other objects and advantages will become apparent to those skilled in the art upon reading the following description taken together with the preferred embodiment disclosed in the accompanied drawings.

BRIEF DESCRIPTION OF THE DRAWINGS

Reference may now be made to the drawings, which illustrate various preferred embodiments that the invention may take in physical form and in certain parts and arrangement of parts wherein.

DETAILED DESCRIPTION OF THE PREFERRED EMBODIMENT

Figure 1:
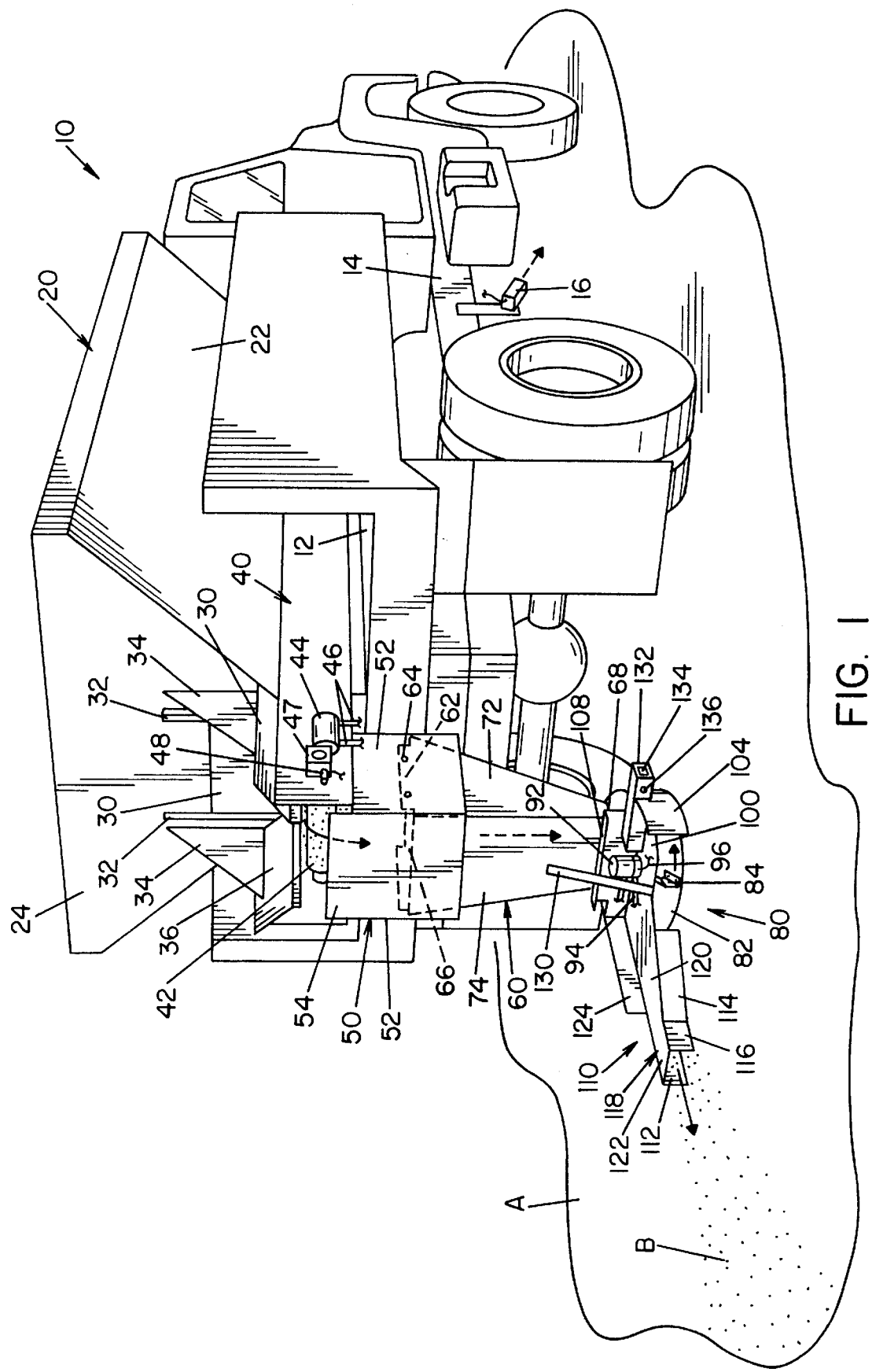
FIG. 1 is a perspective view of a truck which includes the conveyor system and material spreader arrangement in accordance with the present invention.

Referring now to the drawings wherein the showings are for the purpose of illustrating preferred embodiments of the invention only and not for the purpose of limiting the same, FIG. 1 illustrates a conventional truck 10 having a hopper 20 mounted at the back end of the truck. The hopper 20 may be of any suitable type and, as illustrated herein, is of the V-box type which is adapted to receive particulate material B such as salt, sand, chemicals and/or cinders. Hopper 20 includes sides 22 sloping toward the base of the hopper. Mounted in the base of the hopper is a conveyor system 40 which is centrally located in the base of the hopper, preferably below the base plane of the hopper. The conveyor system 40 is adapted to transport particulate materials in the hopper toward the opening in the rear wall of the hopper. The conveyor system is in longitudinal alignment with opening. The conveyor system includes a central longitudinally extending conveyor belt 42 integrated into the base of the hopper 20. The conveyor arrangement includes a front sprocket shaft and a rear sprocket shaft upon which conveyor belt 42 is rotated. Conveyor belt 42 is a fabric belt or a rubber belt. The conveyor belt is shown to have a flat surface; however, the conveyor belt may include ribs to facilitate in the conveyance of particulate material. Alternatively, the conveyor belt may be a series of bar flights. A conveyor motor 44 is connected to the motor gearbox 47 which in turn drives the rear sprocket shaft to move the conveyor belt. A conveyor sensor 48 is connected to motor gearbox 47 to monitor the speed of rotation of conveyor belt 42. Conveyor motor 44 is a hydraulically driven motor and includes two fluid lines 46 for supplying hydraulic fluid to drive the conveyor motor 44. Although not shown, the fluid lines are connected to a pump and a fluid reservoir. A valve may also be attached to the fluid lines 46 to control the flow of fluid to conveyor motor 44. Such a hydraulic arrangement is well known in the art and will not be further discussed. In the embodiment illustrated, the conveyor is of the endless type belt conveyor; however, it is contemplated that other types of conveyors could be used for delivering materials through opening such as a screw type conveyor.

Hopper 20 includes a feedgate 30 to adjust the size of opening in rear wall 24 of hopper 20. Two gate rails 32 guide the feedgate and allows the feedgate to be moved upwardly and downwardly to control the size of opening. Although not shown, the feedgate is moved by a screw drive, hydraulic lift or pulley arrangement. Such arrangements for moving the feedgate are well known in the art and will not be further described.

As shown in FIG. 1, conveyor arrangement 40 extends through opening and rearwardly from hopper rear wall 24. Side flanges 34 and guide plate 36 are connected to the back side of hopper rear wall 24 so as to direct particulate material which is flowing through rear wall opening back onto conveyor belt 42 so that substantially all the particulate material flowing through rear wall opening is deposited into top opening 66 of material bin 50. Material bin 50 includes two side walls 52 and a front wall 54. Preferably, the side walls are mounted to truck bed 12 of truck 10. Material bin 50 is mounted relative to conveyor 40 such that material bin 50 is positioned below the back end of conveyor 40 so that substantially all the materials moving off of conveyor belt 42 are deposited into material bin 50. Front wall 54 of material bend 50 preferably extends upwardly from side walls 52 so as to capture substantially all of the particulate material being conveyed off of conveyor belt 42.

A funnel receptacle 60 is connected to the inner side walls of material bin 50. Funnel receptacle 60 includes two side panels 72, a front panel 74 and a rear panel 70. Side panels 72 include a mount flange 62 adapted to mount side panels 72 to the interior of side walls 52 of material bin 50. Mount flanges 62 include mount openings 64 adapted to receive a connector for securing mount flange 62 to the side walls of material bin 50. Rear panel 70 is mounted on side panels 72 to slope toward front panel 74 to form a funnel receptacle having a wider top opening 66 than a bottom opening 68. In addition, one of the side panels 72 slopes inwardly toward the other side panel so that bottom opening 68 is narrower than top opening 66. The design of the funnel receptacle 60 is adapted to receive materials deposited into material bin 50 and to direct such materials into a specific location in material spreader 80. One preferable funnel design includes the dimensions of the top opening of about 20×20 inches and the bottom opening of about 5×6 inches and the height front panel of about 90 inches. However, other dimensions can be used.

Figure 2:
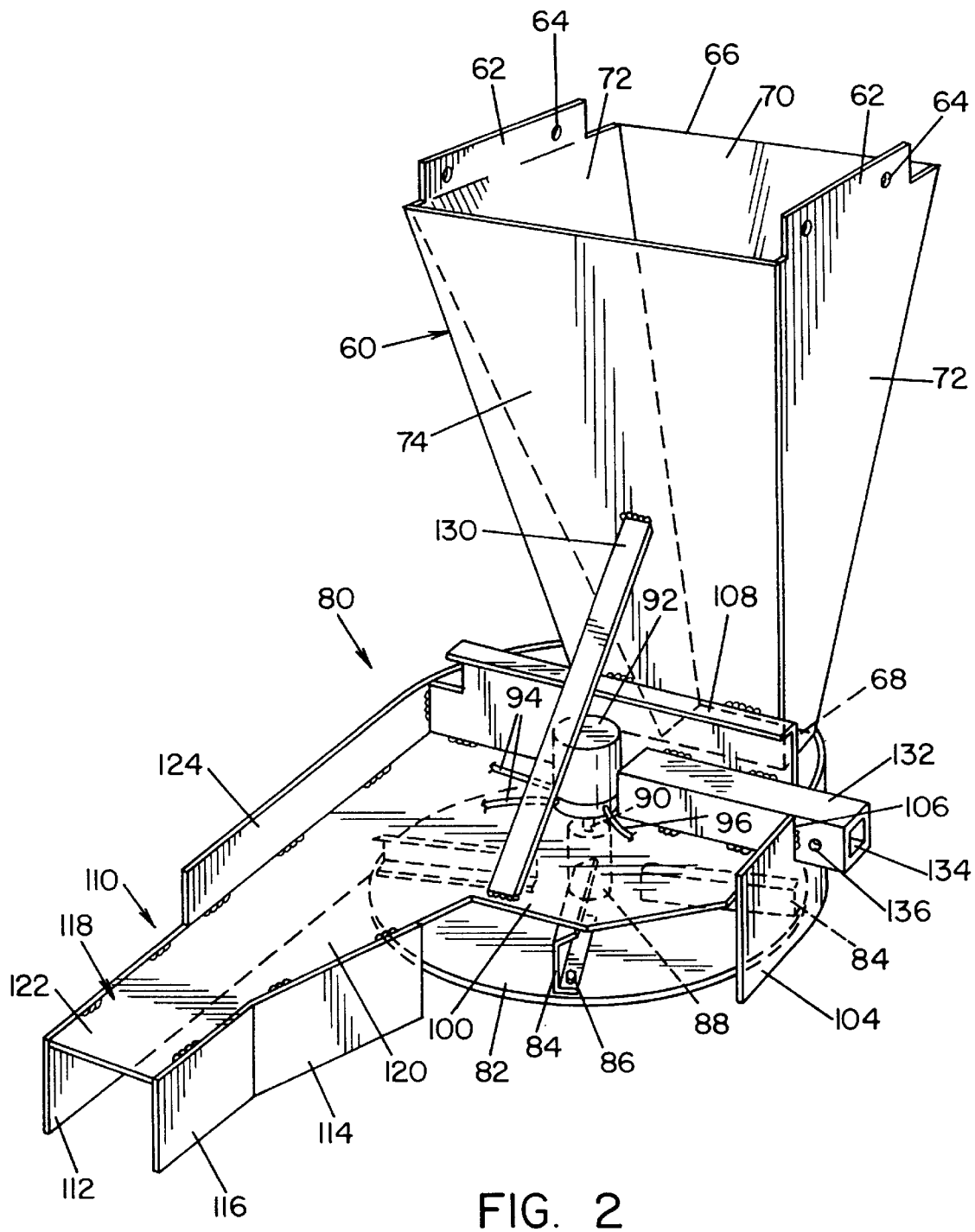
FIG. 2 is an enlarged perspective view of the material spreader as shown in FIG. 1.
Figure 3:
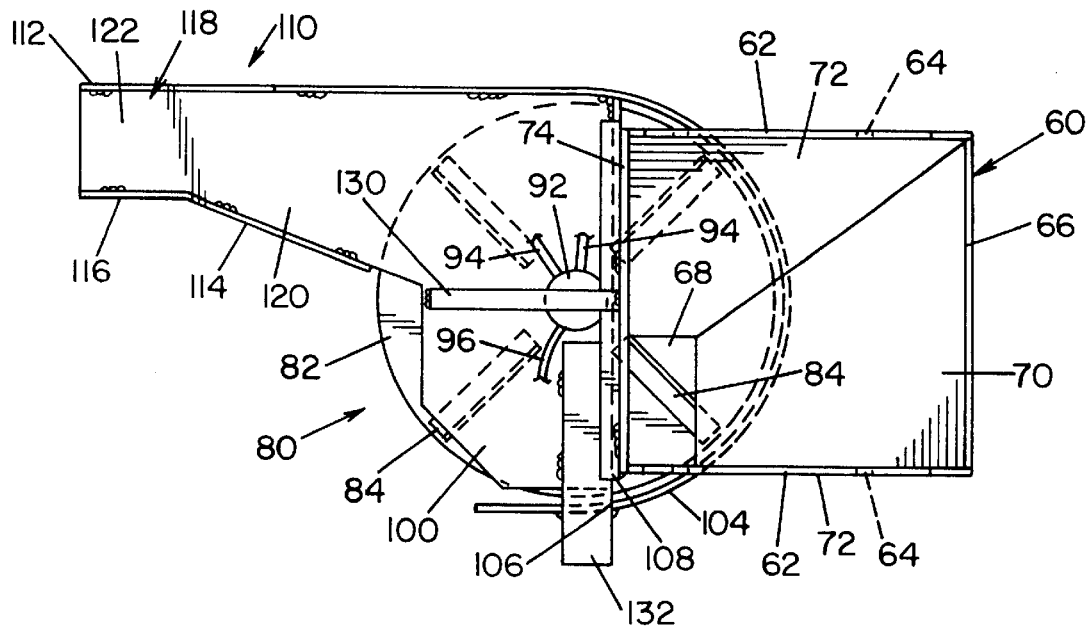
FIG. 3 is a top view of the material spreader as illustrated in FIG. 2.
Figure 4:
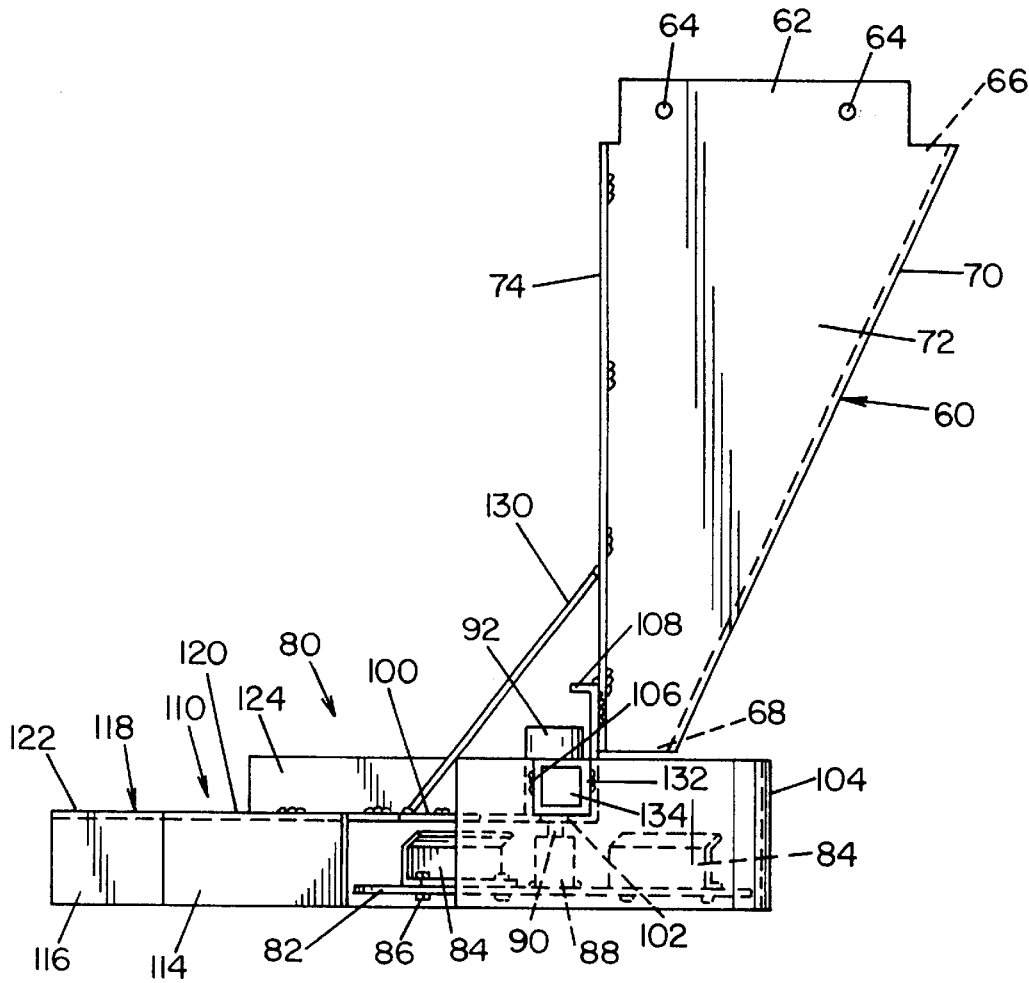
FIG. 4 is a side view of the material spreader as illustrated in FIG. 2.
Figure 5:
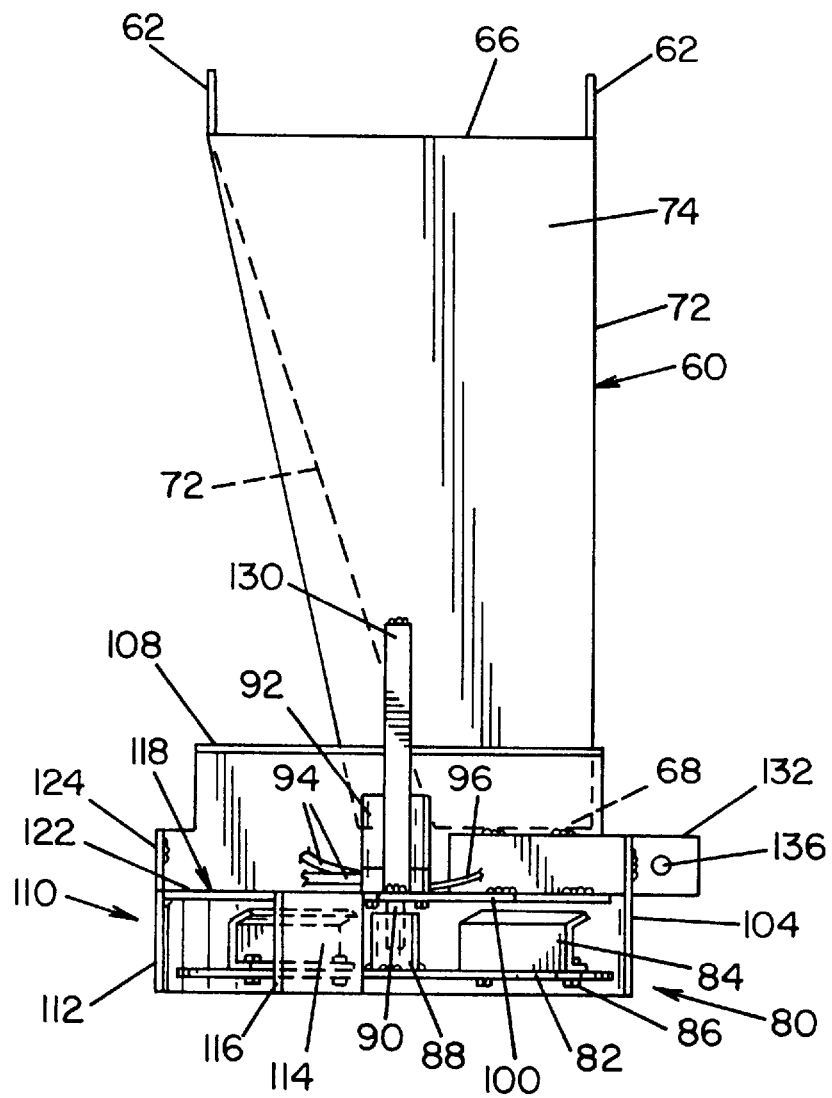
FIG. 5 is a rear view of the material spreader as illustrated in FIG. 2.

As best illustrated in FIG. 2, material spreader 80 includes a disk 82 mounted onto a spreader motor 92. Spreader motor 92 is mounted onto spreader top plate 100 and an axial member 90 extends through motor opening 102 of top plate 100. The axial member of spreader motor 92 is connected to disk connector 88. Disk 82 includes four disk vanes 84 which are mounted to the disk by vane bolts 86. The disk is preferably 18–30 inches in diameter and includes four vanes wherein each vane has a height of about 2–6 inches. More vanes can be used but too many vanes may cause too much bounce as the particulate material is deposited onto ground surface A. The disk as best illustrated in FIGS. 2–4 is mounted to be driven in a counterclockwise direction by a positive displacement type hydraulic disk motor 92 to propel the particulate material to the right side of spreader 80. However, other spreader designs can be used which would require the spinner to rotate in a clockwise direction and propel the particulate material to the left side of spreader 80. Disk motor 92 includes motor fluid lines 94 which supply hydraulic fluid for driving the motor which rotates disk 82. Although not shown, fluid lines 94 are connected to a pump and a fluid reservoir. A valve may also be attached to fluid lines 94 to control the flow of fluid to disk motor 92. Such a hydraulic arrangement is well known in the art and will not be further discussed. Connected to the top surface of top plate 100 is connector flange 108. Connector flange 108 connects the top plate of spreader 80 to the front panel 74 of funnel receptacle 60. Spreader 80 is further connected to funnel receptacle 60 by support bar 130. Support bar 130 helps to maintain spreader 80 in a substantially constant position relative to funnel receptacle 60. Spreader 80 also includes a side plate 104 which is connected to the edge of top plate 100. Side plate 104 extends above the surface of top plate 100 and extends below the surface of top plate 100 to at least the plane in which the disk rotates. Additionally, side plate 104 extends about the perimeter of disk 82 so as to create a retaining wall around the disk extending from the side of the disk around through the back of the disk to the other side of the disk. Side plate 104 is preferably positioned closely adjacent to the disk so as to retain material deposited on the disk from funnel receptacle 60 until the disk has propelled such materials through the backside of material spreader 80. For a disk having a diameter of about 24 inches the diameter of the arcuate portion of the side plate is preferably about 25–26 inches. As illustrated in FIGS. 3 and 4, one function of side plate 104 is to direct the materials flowing through bottom opening 68 of funnel receptacle 60 onto the surface of disk 82.

A lift bar 132 is connected to top plate 100 and the side of connector flange 108 and extends through a side plate slot 106 of side plate 104. Lift bar 132 includes a lift bar opening positioned longitudinally through lift bar 132. Lift bar 132 is adapted to receive a bar connected to a lifter so that material spreader 80 and funnel receptacle 60 can be easily positioned into material bin 50 to connect the material spreader and funnel receptacle to the material bin or alternatively, to disengage the funnel receptacle and material spreader from the material bin. Connector hole 136 is adapted to secure the lift rod which is inserted into lift bar opening 134 when the material spreader and funnel receptacle are being connected and/or engaged from material bin 50.

Connected to the top plate 100 and side plate 104 of material spreader 80 is material guide 110. Material guide 110 is positioned above ground surface A and lies in a plane substantially parallel to the ground surface. The bottom edge of the material guider is positioned at a sufficiently close distance to the ground to minimize the width of the strip or swath of particulate material being deposited on the ground surface by the material guide. Preferably, the material guide is spaced less than 24 inches from the ground surface and more preferably 2 to 14 inches from the ground surface. Material guide 110 includes a planar guide side 112 which is connected to one end of side plate 104 and to the top side edge of top plate 100. As best illustrated in FIGS. 2 and 3, planar guide side 112 is a one-piece planar extension of side plate 104 which extends rearwardly from the truck when material spreader 80 and funnel receptacle 60 are mounted to material bin 50. Planar guide side 112 includes a reinforcement flange 124 extending above the surface of top plate 100. Reinforcement flange 124 is designed to rigidify the position of the material guide 110 with respect to material spreader 80. Preferably, reinforcement flange 124 is an upward extension of planar guide side 112. Material guide 110 also includes a top plate 118. Top plate 118 includes a rectangular section 122 and an angular section 120. Top plate 102 is connected to top plate 100 of material spreader 80 and lies in a plane substantially the same as the plane in which top plane 100 lies. As shown in FIGS. 2 and 3, top plate 118 and top plate 100 are a one-piece unit. Rectangular section 122 of top plate 118 is positioned at the end of material guide 110 and is connected to planar guide side 112 and parallel guide side 116. Angular section 120 of top plate 118 is connected to rectangular section 122 and lies in substantially the same plane as rectangular section 122. Angular section 120 is also connected to angular guide side 114 and planar guide side 112. This design of material guide 110 forms a wide passageway opening positioned closely adjacent to disk 82 which passageway narrows until reaching the passageway formed between planar guide side 112 and parallel guide side 116. In one preferable dimensional arrangement of the material guide, guide side 112 is about 24–26 inches, the height and width of the end section of the material guide is about 6–8 inches, and the angular passageway narrows from a width of 10–14 inches to a width of 6–8 inches.

Figure 6:
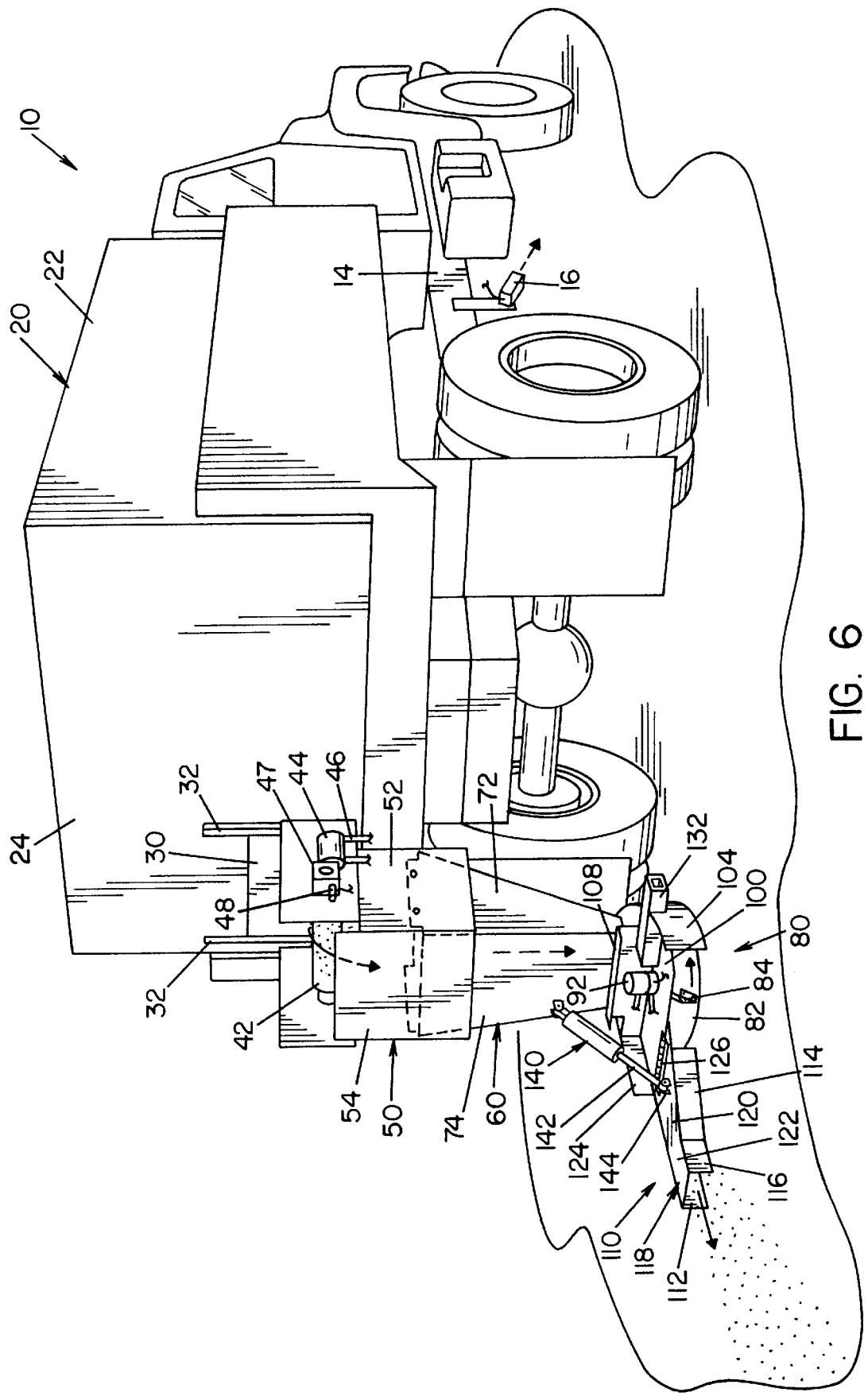
FIG. 6 is a perspective view of a truck, conveyor system and material spreader arrangement as shown in FIG. 1 but illustrating a repositioned and modified spreader design.
Figure 7:
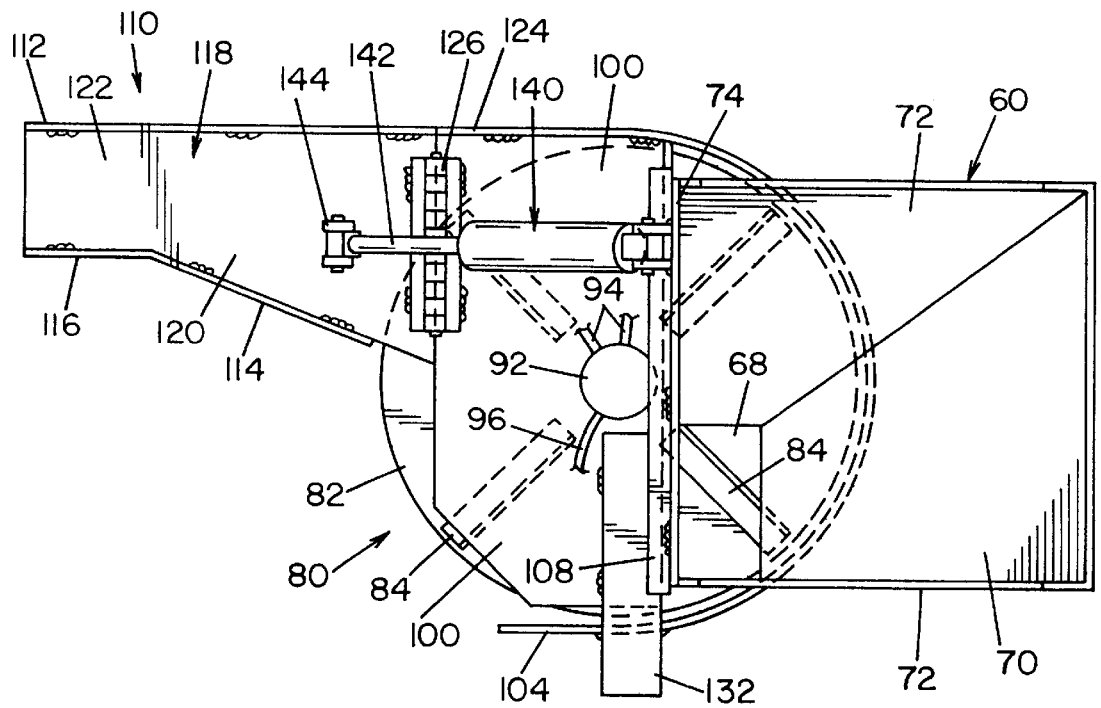
FIG. 7 is a top view of the material spreader as illustrated in FIG. 6.
Figure 8:
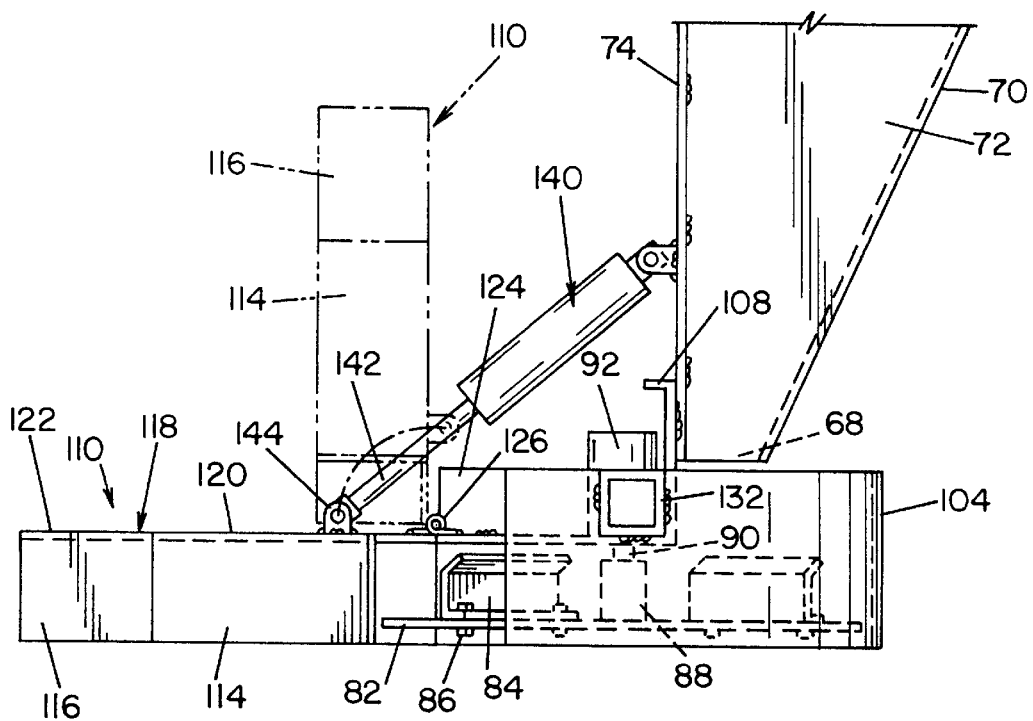
FIG. 8 is a side view of the material spreader as illustrated in FIG. 6.
Figure 10:
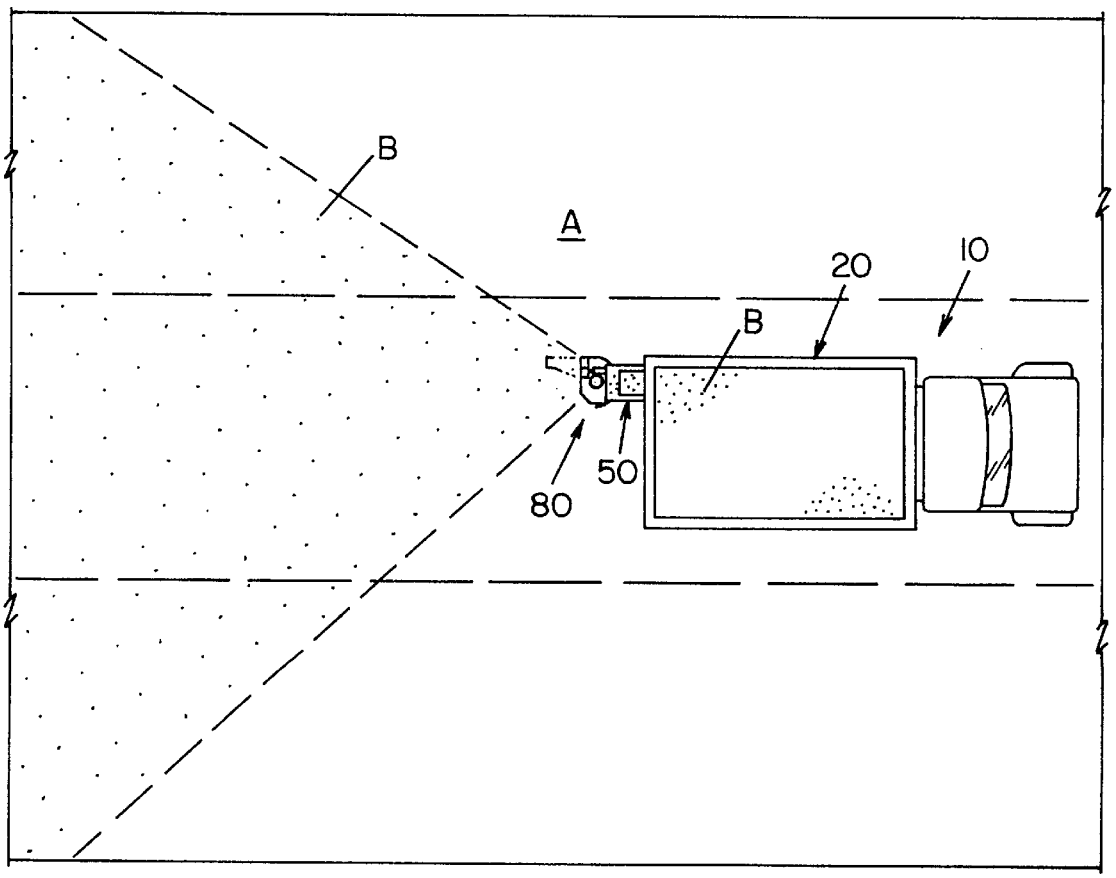
FIG. 10 is an overhead view of a truck and material spreader illustrating the material spreader in a broadcast spreading mode.

Referring now to FIGS. 6–8, the guide top plate 118 is pivotally mounted to top plate 100 of material spreader 80. Such lifting and lowering of material guide 110 with respect to material spreader 80 can be accomplished by substituting support bar 130 with a hydraulic lifter 140. However as can be appreciated, the material guide can alternatively or in combination be lifted by a chain, rope or wire. As best shown in FIGS. 7–8, hydraulic lifter 140 includes a piston 142. Piston 142 is connected to guide top plate 118 by piston hinge 144 and the end of hydraulic lifter 140 is connected to front panel 74 of funnel receptacle 60. Guide top plate is hingably attached to spreader top plate 100 by hinge 126. When piston 142 is extended, material guide 110 is in the engaged position as shown in FIG. 8. When piston 142 is in the retracted position, material guide 110 is in the unengaged position as shown by the phantom lines in FIG. 8. If material guide 110 is in the unengaged position wherein planar guide side 112 and angular guide side 114 do not engage the particulate material being thrown outwardly from material spreader 80 by disk 82, spreader 80 is converted into a broadcast type spreader which disperses particulate material over a wide area of the ground surface during operation as shown in FIG. 10. When the material guide is lifted, the rotational speed of the disk is preferably reduced for broadcast spreading. The reduction of speed can be automatically controlled by the control mechanism. In the broadcast mode, the disk rotational speed is controlled to control the broadcast spread pattern. A controlled broadcast spreading can be initiated by adjusting the speed of the disk to spread a majority of the particulate material at a substantially zero velocity relative to the ground. The controlled broadcast spreading can be made dependent on the monitored speed of the truck. Standard broadcast spreading can also be initiated to cause active bouncing of the particulate material on the ground to spread the particulate material over a wide area behind the truck. The standard broadcast spreading can be made dependent on the speed of the truck and/or the desired width of area to be covered. Preferably such control of the disk rotating speed is controlled by the control mechanism. As can be appreciated, when material guide 110 is again lowered into position so that the material guide engages the particulate material being thrown from the material spreader, the controlled deposition of particulate materials is once again achieved as shown in FIG. 9. If the material guide or a portion of the material guide is lifted by a hydraulic lifter and/or a motor, the lifting and/or lowering of this material guide can be remote controlled by the control mechanism.

In another embodiment not specifically illustrated in the figures, the particulate material being deposited onto disk 82 by funnel receptacle 60 can be directed onto other areas of the disk by an adjusting chute arrangement positioned inside of funnel receptacle 60. As can be appreciated, the deposition of particulate material in different areas of disk 82 will cause different spray patterns of the material during operation of the material spreader. For instance, when the particulate material is deposited generally at the front center of the disk, the material spreader will tend to operate as an ordinary type broadcast spreader when the material guide is not in engagement. When, however, the particulate material is deposited near one side of the disk as illustrated in FIGS. 2 and 3, the particulate material will be propelled toward side plate 104 of material spreader 80 until the material is propelled toward material guider 110. Upon reaching the material guider, the particulate material leaves disk 82 and is propelled into material guide 110. The material is then guided by planar guide side 112 and angular guide side 114 and angular section 120 until the path of the particulate material narrows and reaches parallel guide side 116 and rectangular section 122. Such an arrangement better ensures that the rotating disk propels the particulate material at a desired and substantially more uniform velocity since the particulate material is retained on the rotating disk for a longer period of time. The chute arrangement is preferably moved by a hydraulic piston and is further preferably controlled by the control mechanism.

Reference is now made to the control mechanism and the control sequence of the control mechanism as illustrated in FIG. 11. The control mechanism preferably includes a switch panel connected to the dashboard of the truck, not shown. The switch panel is preferably a microprocessor-based control console. The switch panel allows the control mechanism to be activated and deactivated. The switch panel also includes controls for controlling the conveyor system and/or the material spreader arrangement. The switch panel further provides a switch for selecting the quantity of particulate material to be deposited on ground surface A over a certain distance traveled by the truck (i.e. lbs/mile). The control mechanism may also include a display unit to display the speed of the conveyor belt of conveyor 40 and/or the rotational speed of the disk of material spreader 80. The control mechanism also includes an arithmetic function table and/or a state table in memory to enable the control system to control the speed of the conveyor belt and/or the rotational speed of the disk (i.e. rpm/mph) relative to the speed at which the truck travels in a forward direction. These arithmetic functions and/or state table values may be preprogrammed into a memory chip of the control mechanism. As illustrated in FIG. 11, the controller is activated and the desired quantities of particulate material to be deposited on the ground surface are selected. Once the particulate quantity is selected, the material spreader arrangement and conveyor system are activated and the controller automatically regulates the rotational speed of the disk and the speed of the conveyor belt until the control mechanism is deactivated. The control mechanism may also include a switch panel for controlling the liquid de-icer spray system and control the amount of de-icer deposited on the ground. The control mechanism may also control the amount of de-icer deposited per mile traveled by the truck (i.e. gal/mile). The control of the de-icer fluid may also be coupled with the control of the spinner speed and/or conveyor velocity. The control mechanism may include an arithmetic function and/or state tables to control the de-icer fluid flow relative to the truck speed.

In summary, the control mechanism preferably has the capability to spread particulate material and liquid de-icer at the same time or separately, and further has the capability to regulate the amount of particulate material and liquid de-icer as a function of the distance and/or speed the truck travels. The controller also preferably has the capacity to control zero velocity spreading of the particulate material. The controller further preferably has the capability to control a controlled broadcast spreading. The control panel may include indicators for the type of liquid de-icer and/or particulate material being spread on the ground surface, the amount of particulate material and/or liquid de-icer which has been deposited on the ground, indicators for the amount of particulate material and/or liquid de-icer left to be deposited, indications for showing the selected mode of operation, memory for recording the spreading of particulate material and/or liquid de-icer which has been deposited, memory for retaining state tables and/or function equations for controlling the depositing of particulate material and/or liquid de-icer, alarm indicators to indicate an error in operation and/or a problem in the spreading system, and/or switches for adjusting the parameters for spreading.

If zero velocity spreading is desired, the zero velocity switch is activated on the controller which sends a signal to the material spreader arrangement which signal is dependent on the velocity of the truck. In such operation, the control mechanism acquires the truck velocity by reading the signal from radar gun 16 which is attached to truck frame 14. As can be appreciated, the truck speed can also or alternatively be obtained from the speedometer of the truck and/or by a sensor connected to the wheel or axle of the truck. The acquired truck velocity is then used to obtain a signal value for the material spreader arrangement which is dependent on the acquired truck velocity value. The signal value is then sent to the material spreader arrangement to control the speed of the rotating disk so that the rotating disk causes the particulate material being expelled through material guide 110 to have a velocity which is substantially equal to the velocity of the forward velocity of the truck. Preferably, the signal value is sent to a valve controller, such as a pulse width modulated hydraulic valve, not shown, to control the flow of fluid through fluid lines 94 thereby controlling the speed of disk motor 92. When the rearward velocity of the particulate material is equivalent to the forward velocity of the truck, the material exiting material guide 110 has a relative velocity to the ground of substantially zero thereby being deposited on the ground surface as if the material had been dropped in place when the truck was not moving. This zero velocity spreading allows for the particulate material to be deposited from the material spreader arrangement in a substantially narrow strip on the road as the truck is moving in a forward direction. Due to the design of the material guide, the velocity at which the material can be expelled from the material guide is dependent primarily on the rotational speed of disk 82 since material guide 110 does not substantially reduce the velocity of the material as the material passes through the material guide. If constant quantity spreading is desired, the constant quantity switch is activated and the desired quantity of particulate material to be spread on ground surface A relative to the distance the truck moves is also selected. Preferably such values can be input on the switch panel. In such operation, the control mechanism acquires the truck velocity by reading the signal from radar gun 16, by reading the signal from the truck speedometer and/or by some other arrangement. The acquired truck velocity is then used to obtain a signal value for the conveyor system which is dependent on the acquired truck velocity value and the selected particulate deposition quantity. The signal value is then sent to the conveyor system to control the speed of the material mover so that the material mover causes a desired quantity of particulate material for distance traveled by the truck to be expelled through the rear opening in the hopper and into the material spreader arrangement for spreading onto ground surface A. Preferably, the signal value is sent to a value controller, such as a pulse width modulated hydraulic valve, not shown, to control the flow of fluid through fluid lines 46 thereby controlling the speed of conveyor motor 44. As can be appreciated, the signal sent to the conveyor 40 from the control mechanism is a value which produces a rotational speed of the conveyor belt which will cause a desired quantity of particulate material to flow through rear opening of hopper 20 and into spreader 80 to be deposited on the ground surface. The control mechanism constantly monitors the speed of the vehicle and upon detecting a change in the speed of the vehicle, new values are processed and sent to the conveyor 40 and spreader 80. If zero velocity spreading and constant quantity spreading is desired, the zero velocity switch and the constant quantity switch are activated and the desired deposition quantity is selected. In such operation, the control mechanism obtains signal values for both the material spreader arrangement and conveyor system and simultaneously controls both the material spreader arrangement and conveyor system as discussed above.

Figure 11:
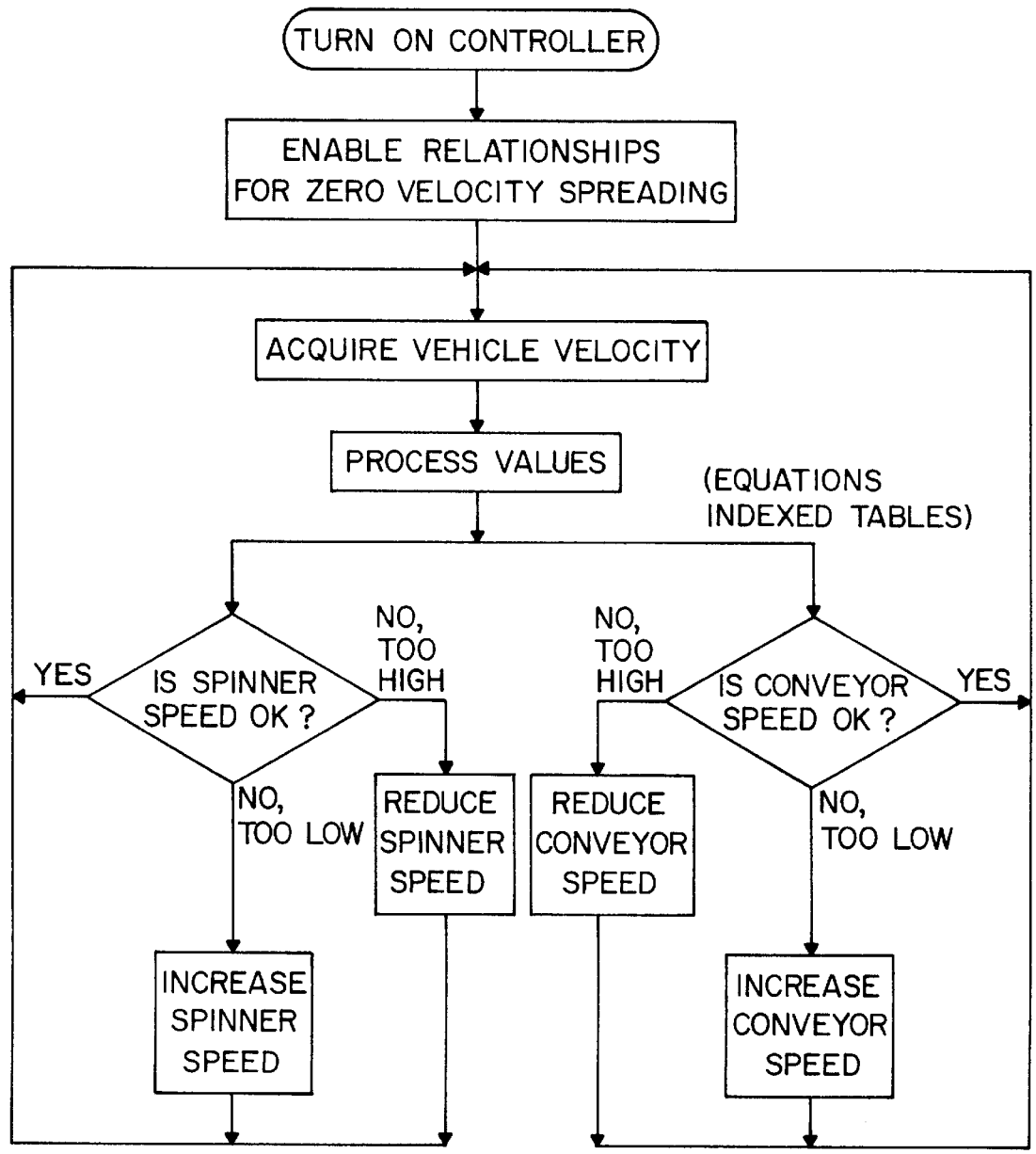
FIG. 11 is a flow chart diagram of the control mechanism for controlling the conveyor system and material spreader arrangement in accordance with the present invention.

The control mechanism may include a feedback control structure as illustrated in FIGS. 1, 6 and 11. Feedback control of the conveyor is achieved by connecting a sensor 48 to gearbox 47 to monitor the speed of the conveyor belt. This signal reflects the actual speed of the conveyor belt and is then compared to the desired speed of the conveyor belt. If the speed of the conveyor belt is too high, the signal being sent to the conveyor is adjusted accordingly so as to reduce the speed of the conveyor belt. However, if the conveyor speed is too low, the control mechanism will send a modified signal to the conveyor to increase the speed of the conveyor belt. This feedback control structure enables for accurate deposition rates of the particulate material during operation of the vehicle. The feedback control system for the spreader operates in a similar fashion to that of the conveyor. As shown in FIGS. 1 and 6, a speed sensor cable 96 is connected to spreader motor 92 to send a signal to the control mechanism which is indicative of the actual speed of the spreader motor. If the detected speed of the motor is too low, the control mechanism sends a modified signal to increase the speed of this motor. However, if the detected speed of the motor is too high, the control mechanism sends a modified signal to the motor to reduce the speed of the motor. This feedback control system tightly controls the speed of rotation of the disk so that the velocity of the particulate material exiting material guide 110 is substantially equal to the forward velocity of the truck vehicle so that the particulate material has a relative velocity to the ground surface of substantially zero. Although not completely shown in FIGS. 1 and 6, the hydraulic control circuits for controlling the speed of the conveyor belt and disk are conventional of the type disclosed in U.S. Pat. No. 3,113,784. In general, the hydraulic control circuit includes a pump mechanism which pumps fluid out of the reservoir through a conduit. The pump mechanism may be conveniently driven from the truck engine at a speed that varies with the speed of the engine;

however, the pump may be driven by an independent motor so that the pump speed is independent of the speed of the vehicle. The pump is designed to pump hydraulic fluid through motor fluid lines 46 and 94 so as to drive conveyor motor 44 and spreader motor 92, respectively. The fluid which passes through the motors is returned to a reservoir which feeds the pump with hydraulic fluid which is returned once again to the motors. A pressure valve, not shown, is included on motor fluid line 46 and motor fluid line 94 to control the flow of hydraulic fluids through these fluid lines. The control mechanism is designed to regulate these fluid valves thereby controlling the speed of the motors. In such an arrangement, the valves, servomotors and controls are generally located in the cab of the truck; however, these controls may be located in any location of the truck.

As can be appreciated, the control mechanism may be engaged to only control the spreader or the conveyor during certain operations. Furthermore, if the material guide 110 is mounted so as to be movable into engaged and disengaged positions as shown in FIGS. 6–8, the control mechanism can include a switch which moves the material guide into a desired position from a remote location. Furthermore, if funnel receptacle 60 includes an adjustable chute arrangement which can adjust the position of the particulate material being deposited onto disk 82, the control mechanism could include one or more switches to control the position of the particulate material being deposited onto disk 82.

Figure 9:
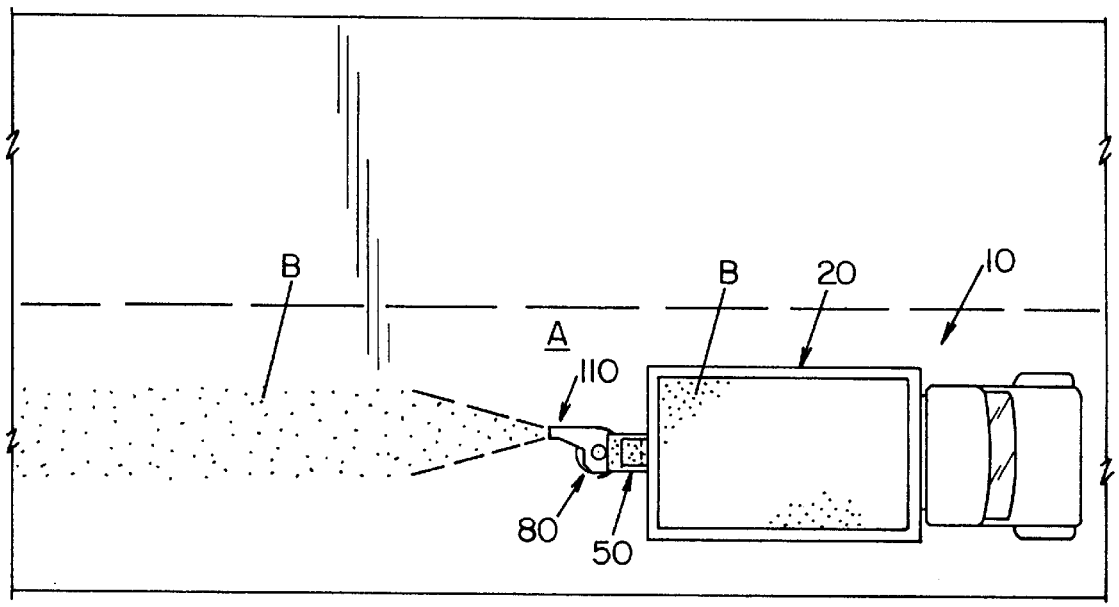
FIG. 9 is an overhead view of a truck and spreader arrangement illustrating the material spreader in a zero velocity mode.

In summary, the design of the material guider enables particulate material to be deposited on the ground surface at substantially zero velocity relative to the ground surface. Such zero velocity spreading can be achieved at truck velocities substantially exceeding 35 mph and at speeds up to 45–70 mph. By allowing the truck to travel at higher speeds, a larger area of ground surface can be treated. In addition, the higher truck speeds will reduce the chance of rear end collision on roads. During operation, very little particulate material bounce will occur and over 90% of the material stays within a 1–4 foot swath when deposited on the ground surface as illustrated in FIG. 9. The material guider is designed so as not to substantially reduce the velocity of the material as it travels through the material guider. This design enables increased velocities of the truck while still maintaining zero velocity spreading.

The invention has been described with reference to a preferred embodiment and alternates thereof. It is believed that many modifications and alterations of the embodiment disclosed will readily suggest themselves to those skilled in the art upon reading and understanding the detailed description of the invention. It is intended to include all such modifications and alterations in so far as they come within the scope of the present invention.

Having thus described the invention, it is claimed:

1. In a truck having a hopper for holding materials, a conveyor arrangement and a material spreader, said hopper including a base lying in a base plane, two side walls, and a rear wall, said rear wall including a rear opening and a feedgate, said rear opening positioned at least closely adjacent to said base plane to allow said materials to be dispensed from said hopper, said feedgate adapted to regulate said dispensement of said materials through said rear opening, said conveyor arrangement mounted in said hopper base and in longitudinal alignment with said rear opening and including a material mover, said material spreader positioned rearwardly of said hopper and adapted to receive materials dispensed from said hopper and spread said received materials onto a ground surface, the improvement comprising a control mechanism to regulate the speed said conveyor arrangement conveys said materials to said rear opening and to regulate the velocity said materials are ejected from said material spreader, said material spreader including a material guider to guide the trajectory of substantially all said materials received from said hopper in a direction substantially opposite the direction of forward movement of said truck, and a mechanism to move said material guider into and out of engagement with said materials, said control mechanism including a velocity sensor and velocity controller, said velocity sensor adapted to detect the velocity of said truck in said forward direction and to send a signal indicative of said truck velocity to said velocity controller, said velocity controller adapted to receive said signal from said velocity sensor and send a signal to said conveyor arrangement and said material spreader which is dependent on said signal received from said velocity sensor, said signal to said conveyor arrangement controlling said speed of said material mover, said signal to said material spreader controlling said velocity of said materials ejected from said material spreader to obtain a material velocity relative to said ground surface of substantially zero when said truck is moving in said forward direction.

2. A truck as defined in claim 1, wherein said conveyor arrangement is mounted below said base plane.

3. A truck as defined in claim 1, wherein said material mover is selected from the group consisting of a continuous belt, a chain link and an auger.

4. A truck as defined in claim 1, wherein said material spreader includes a spinner mounted for rotation about a generally upright axis.

5. A truck as defined in claim 4, wherein said material spreader includes a spinner having at least one vane and a wall extending around a portion of said spinner, said spinner adapted to propel said materials received in said material spreader toward said material guider, said wall adapted to retain substantially all of said material on said spinner until said material is propelled toward said material guider.

6. A truck as defined in claim 1, wherein said material spreader includes a rotating member having at least one vane and a wall extending around a portion of said rotating member, said rotating member adapted to propel said materials received in said material spreader toward said material guider, said wall adapted to retain substantially all of said material on said rotating member until said material is propelled toward said material guider.

7. A truck as defined in claim 5, wherein said material guide including a substantially planar wall positioned closely adjacent to said spinner and extending rearwardly from said spinner in a plane substantially parallel to the longitudinal axis of said truck.

8. A truck as defined in claim 6, wherein said material guide including a substantially planar wall positioned closely adjacent to said rotating member and extending rearwardly from said rotating member in a plane substantially parallel to the longitudinal axis of said truck.

9. A truck as defined in claim 8, wherein said material guider including a varying width passageway having a wide end and a narrow end, said wide end positioned closely adjacent to said rotating member.

10. A truck as defined in claim 7, wherein said material guider including a varying width passageway having a wide end and a narrow end, said wide end positioned closely adjacent to said rotating member.

11. A truck as defined in claim 5, said wall projecting above said spinner disk a distance greater than the height of said at least one vane.

12. A truck as defined in claim 6, wherein said rotating member is a spinner disk mounted for rotation about a generally upright axis, said wall projecting above said spinner disk a distance greater than the height of said at least one vane.

13. A truck as defined in claim 1, wherein said material spreader includes a rotating member adapted to propel said materials received in said material spreader toward said material guider, means for rotating said rotating member and a rotational monitor, said velocity controller sending said signal to said means for rotating to control the rotational velocity of said rotating member, said rotational monitor adapted to monitor said rotational velocity of said rotating member and sending a signal to said control mechanism which signal being indicative of said rotational velocity of said rotating member.

14. A truck as defined in claim 4, wherein said material spreader includes means for rotating said spinner to propel said material toward said material guider and a rotational monitor, said velocity controller sending said signal to said means for rotating to control the rotational velocity of said spinner, said rotational monitor adapted to monitor said rotational velocity of said spinner and sending a signal to said control mechanism which signal being indicative of said rotational velocity of said spinner.

15. A truck as defined in claim 11, wherein said material spreader includes means for rotating said spinner to propel said material toward said material guider and a rotational monitor, said velocity controller sending said signal to said means for rotating to control the rotational velocity of said spinner, said rotational monitor adapted to monitor said rotational velocity of said spinner and sending a signal to said control mechanism which signal being indicative of said rotational velocity of said spinner.

16. A truck as defined in claim 1, wherein said conveyor arrangement includes a movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

17. A truck as defined in claim 14, wherein said conveyor arrangement includes a movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

18. A truck as defined in claim 15, wherein said conveyor arrangement includes a movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

19. A truck as defined in claim 13, wherein said conveyor arrangement includes a movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

20. A truck as defined in claim 19, wherein said control mechanism modifies said signal sent to said movement means of said conveyor arrangement based upon said received signal from said movement monitor and modifies said signal sent to said means for rotating said rotating member based upon said received signal from said rotational monitor.

21. A truck as defined in claim 17, wherein said control mechanism modifies said signal sent to said movement means of said conveyor arrangement based upon said received signal from said movement monitor and modifies said signal sent to said means for rotating said rotating member based upon said received signal from said rotational monitor.

22. A truck as defined in claim 18, wherein said control mechanism modifies said signal sent to said movement means of said conveyor arrangement based upon said received signal from said movement monitor and modifies said signal sent to said means for rotating said rotating member based upon said received signal from said rotational monitor.

23. A truck as defined in claim 1, wherein said control mechanism regulates said speed of said material mover relative to the forward velocity of said truck to substantially deposit a constant amount of said material on said ground surface per distance traveled by said truck.

24. A truck as defined in claim 4, wherein said control mechanism regulates said speed of said material mover relative to the forward velocity of said truck to substantially deposit a constant amount of said material on said ground surface per distance traveled by said truck.

25. A truck as defined in claim 21, wherein said control mechanism regulates said speed of said material mover relative to the forward velocity of said truck to substantially deposit a constant amount of said material on said ground surface per distance traveled by said truck.

26. A truck as defined in claim 22, wherein said control mechanism regulates said speed of said material mover relative to the forward velocity of said truck to substantially deposit a constant amount of said material on said ground surface per distance traveled by said truck.

27. In a truck having a hopper for holding materials, a conveyor arrangement and a material spreader, said hopper including a base and at least one wall, said at least one wall including a wall opening to allow said materials to be dispensed from said hopper, said conveyor arrangement adapted to move said materials in said hopper to said wall opening, said material spreader adapted to receive materials dispensed through said wall opening and spread said materials onto a ground surface, the improvement comprising a control mechanism to regulate the speed said conveyor arrangement conveys said materials to said wall opening and to regulate the velocity said materials are ejected from said material spreader, said material spreader including a material guider to guide the trajectory of substantially all said received materials in a direction substantially opposite the direction of forward movement of said truck, and a mechanism to move said material guider into and out of engagement with said materials, said control mechanism including a velocity sensor and velocity controller, said velocity sensor adapted to detect the velocity of said truck in said forward direction and to send a signal indicative of said truck velocity to said velocity controller, said velocity controller adapted to receive said signal from said velocity sensor and send a signal to said conveyor arrangement and said material spreader which is dependent on said signal received from said velocity sensor, said signal to said conveyor arrangement controlling said speed, said material being conveyed to said wall opening, said signal to said material spreader controlling said velocity of said materials ejected from said material spreader.

28. A truck as defined in claim 27, wherein said conveyor arrangement includes a material mover selected from the group consisting of a continuous belt, a chain-link and an auger.

29. A truck as defined in claim 27, wherein said velocity controller sending said signal to said material spreader to obtain a material velocity of said ejected materials of substantially zero relative to said ground surface when said truck is moving in said forward direction.

30. A truck as defined in claim 27, wherein said velocity controller sending said signal to said conveyor arrangement to regulate said speed of said conveyor arrangement conveys material to said wall opening relative to the forward velocity of said truck to deposit a substantially constant amount of said material on said ground surface per distance traveled by said truck.

31. A truck as defined in claim 29, wherein said velocity controller sending said signal to said conveyor arrangement to regulate said speed of said conveyor arrangement conveys material to said wall opening relative to the forward velocity of said truck to deposit a substantially constant amount of said material on said ground surface per distance traveled by said truck.

32. A truck as defined in claim 27, wherein said material spreader includes a spinner mounted for rotation about a generally upright axis.

33. A truck as defined in claim 31, wherein said material spreader includes a spinner mounted for rotation about a generally upright axis.

34. A truck as defined in claim 32, wherein said material spreader includes a spinner having at least one vane and a wall extending around a portion of said spinner, said wall adapted to retain substantially all of said materials on said spinner until said material is propelled toward said material guider.

35. A truck as defined in claim 33, wherein said material spreader includes a spinner having at least one vane and a wall extending around a portion of said spinner, said wall adapted to retain substantially all of said materials on said spinner until said material is propelled toward said material guider.

36. A truck as defined in claim 34, wherein said wall projecting above said spinner disk a distance greater than the height of said at least one vane.

37. A truck as defined in claim 27, wherein said material spreader includes a rotating member adapted to propel said materials received in said material spreader toward said material guider, means for rotating said rotating member and a rotational monitor, said velocity controller sending said signal to said means for rotating to control the rotational velocity of said rotating member, said rotational monitor adapted to monitor said rotational velocity of said rotating member and sending a signal to said control mechanism which signal being indicative of said rotational velocity of said rotating member.

38. A truck as defined in claim 31, wherein said material spreader includes means for rotating said rotating member to propel said material toward said material guider and a rotational monitor, said velocity controller sending said signal to said means for rotating to control the rotational velocity of said rotating member, said rotational monitor adapted to monitor said rotational velocity of said rotating member and sending a signal to said control mechanism which signal being indicative of said rotational velocity of said rotating member.

39. A truck as defined in claim 35, wherein said material spreader includes means for rotating said rotating member to propel said material toward said material guider and a rotational monitor, said velocity controller sending said signal to said means for rotating to control the rotational velocity of said rotating member, said rotational monitor adapted to monitor said rotational velocity of said rotating member and sending a signal to said control mechanism which signal being indicative of said rotational velocity of said rotating member.

40. A truck as defined in claim 28, wherein said conveyor arrangement includes a movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

41. A truck as defined in claim 31, wherein said conveyor arrangement includes a material mover and movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

42. A truck as defined in claim 37, wherein said conveyor arrangement includes a material mover and movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

43. A truck as defined in claim 38, wherein said conveyor arrangement includes a material mover and movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

44. A truck as defined in claim 39, wherein said conveyor arrangement includes a material mover and movement means for moving said material mover and a movement monitor adapted to monitor the velocity of said material mover, said velocity controller sending said signal to said movement means to control the velocity of said material mover, said movement monitor sending a signal to said control mechanism which signal being indicative of said velocity of said material mover.

45. A truck as defined in claim 42, wherein said control mechanism modifies said signal sent to said movement means of said conveyor based upon said received signal from said movement monitor and modifies said signal sent to said means for rotating said rotating member based upon said received signal from said rotational monitor.

46. A truck as defined in claim 43, wherein said control mechanism modifies said signal sent to said movement means of said conveyor based upon said received signal from said movement monitor and modifies said signal sent to said means for rotating said rotating member based upon said received signal from said rotational monitor.

47. A truck as defined in claim 44, wherein said control mechanism modifies said signal sent to said movement means of said conveyor based upon said received signal from said movement monitor and modifies said signal sent to said means for rotating said rotating member based upon said received signal from said rotational monitor.

48. A material spreader adapted to be mounted to a dump body and adapted to receive material from said dump body and to spread said materials onto a ground surface, said material spreader comprising a material projector mechanism, a projector mechanism controller, a material guider, and a mechanism to move said material guider into and out of engagement with said materials from said dump body, said material projector mechanism adapted to project materials received from said dump body toward said material guider, said projector controller adapted to control the velocity of material projected by said material projector mechanism toward said material guider, said material guider including a front end, a dispensement end and a narrowing section positioned between said front end and said dispensement end, said front end adapted to receive materials projected from said material projector mechanism, said narrowing section adapted to narrow the path of said materials passing between said front end and said dispensement end.

49. A material spreader as defined in claim 48, including a material guide positioner, said material positioner adapted to move said material guider into and out of engagement with said material projected by said material projector mechanism.

50. A material spreader as defined in claim 48, wherein said material projection mechanism includes a spinner having at least one vane and a wall extending at least around a portion of said spinner, said wall adapted to retain at least a portion of said materials on said spinner until said materials are projected toward said material guider.

51. A material spreader as defined in claim 48, wherein said projector controller controlling the velocity of projected material as a function of the velocity of said dump body.

* * * * *